United States Patent [19]
Browning et al.

[11] Patent Number: 5,228,532
[45] Date of Patent: Jul. 20, 1993

[54] BATTERY HOLD DOWN STRAP

[75] Inventors: Teresa M. Browning, Columbus; Joseph W. Staniszewski, Dublin, both of Ohio

[73] Assignee: ITW-NIFCO, Hillard, Ohio

[21] Appl. No.: 823,716

[22] Filed: Jan. 22, 1992

[51] Int. Cl.⁵ .............................................. B60R 18/02
[52] U.S. Cl. .................................... 180/68.5; 24/339; 24/459
[58] Field of Search ............... 180/68.5; 411/324, 437, 411/338, 301; 24/339, 459

[56] References Cited

U.S. PATENT DOCUMENTS

| | | | |
|---|---|---|---|
| 3,043,902 | 7/1962 | Klein | 24/339 |
| 3,298,454 | 1/1967 | Anderson et al. | 180/68.5 |
| 3,463,870 | 8/1969 | Eucker | 24/459 |
| 4,565,256 | 1/1986 | Valdez | 180/68.5 |

FOREIGN PATENT DOCUMENTS 3019303 11/1981 Fed. Rep. of Germany ........ 24/459

Primary Examiner—Eric D. Culbreth
Attorney, Agent, or Firm—Trexler, Bushnell, Giangiorgi & Blackstone, Ltd.

[57] ABSTRACT

A strap, for releasably holding a battery in a predetermined position on a platform having a projecting stud flanking the battery, comprises a stud engaging portion connected integrally with a bar engagable with the battery for traversing and releasably holding the battery in the predetermined position. The stud engaging portion has a section engagable with the projecting stud. The stud engaging portion includes levers for shifting the section between a stud engaging position and a stud releasing position.

26 Claims, 1 Drawing Sheet

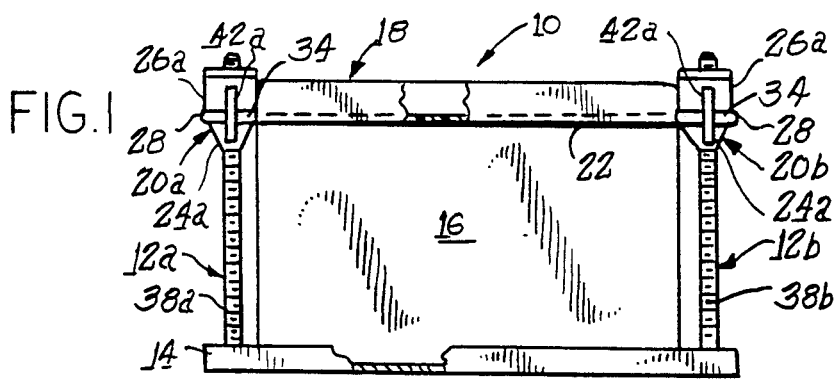
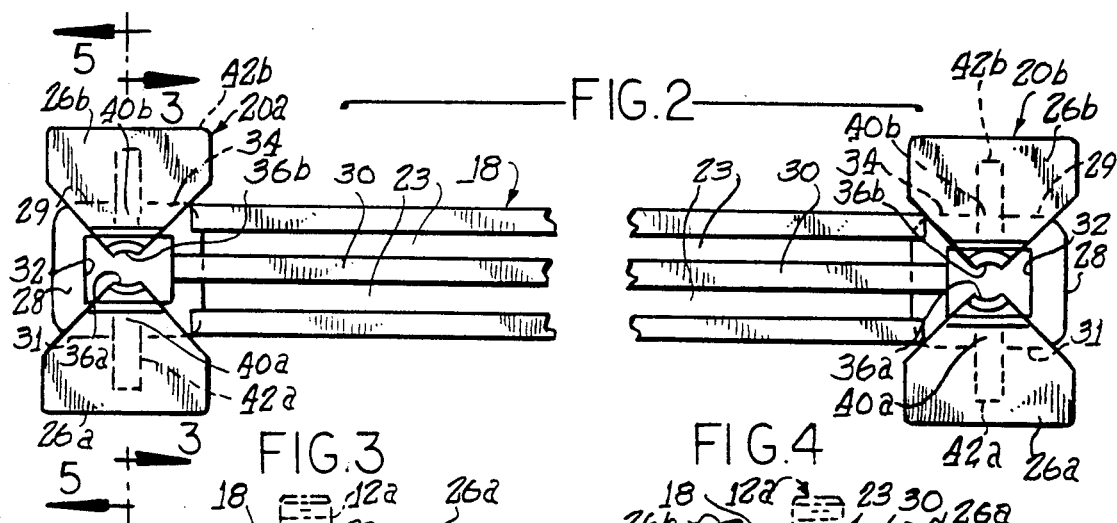
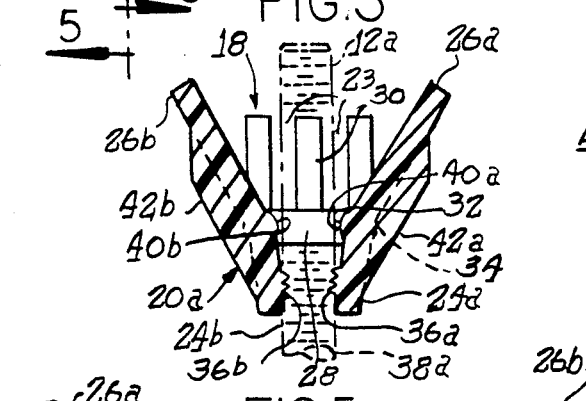
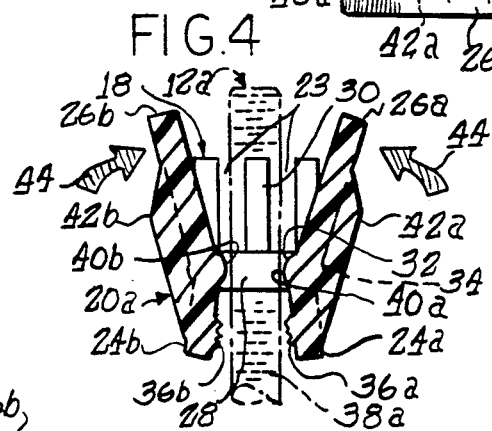
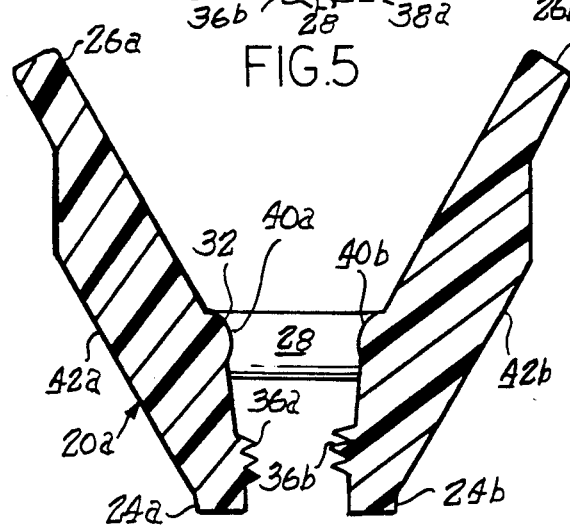
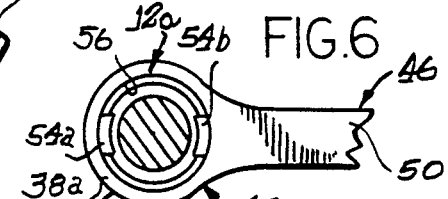
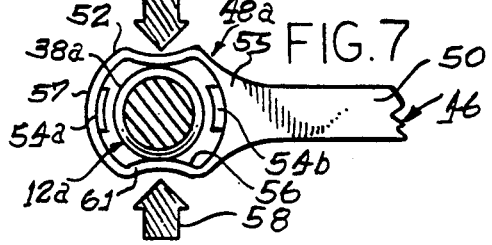

BATTERY HOLD DOWN STRAP

BACKGROUND AND SUMMARY OF THE INVENTION

The invention relates generally to a unique device for releasably retaining an object in a predetermined disposition. More specifically, the invention relates to a uniquely constructed and functioning hold down strap for releasably holding a battery.

The basic structure and functionality of battery hold down straps are well known to those having ordinary skill in the relevant art. Such straps are often used to retain a battery in a predetermined disposition within another device, such as an automobile and the like. Because those other devices often undergo a substantial amount of jostling during operation, the hold down strap must hold the battery with sufficient strength to resist the dislodging effects of the jostling. Also, because most batteries do not remain effective eternally, the straps must be removable to allow for service and replacement of the battery.

One common structure for such straps is a block variably releasably attachable to a platform bearing the battery by a threaded stud. The block is attached to the platform after placement of the battery thereon. As the threaded stud is threadibly inserted through the block and into the platform, the block engages a portion of the battery. After sufficiently threading the stud into the platform, the engagement between the block and the battery firmly retains the battery in a predetermined disposition on the platform. Because the threading of the stud can be reversed, the block can be removed from engagement with the battery to remove the same.

In alternative embodiments, the threaded stud can, at one end, be fixed to the platform, and project upwardly beyond a top surface of the battery. Also, more than one stud can be provided. The stud is inserted into the block after battery insertion into the platform, and the block is moved down the shank of the stud until the block engages the battery or a portion thereof. To secure the block in a proper, battery engaging position, an internally threaded nut is threadibly applied to the free end of the stud. The nut is threaded on the stud sufficiently to clampingly compress the battery between the platform and the block, thereby retaining the battery in a predetermined position. The block in this embodiment can also be removed, allowing for service and replacement of the battery.

These constructions of hold down straps perform their function well. However, especially considering the cramped working conditions often encountered in engine compartments of modern day automobiles, the constructions of the prior art hold down straps present numerous difficulties.

Regarding the first-discussed prior art embodiment, the stud can be relatively short in length if the block engages the battery along a bottom portion thereof. The stud often has a polygonal head, requiring utilization of an appropriate socket to rotate the stud. In this case, to install and to remove the block, an elongated extension must be connected between the socket and a wrench, or other source of torque, to cause rotation of the stud. Additionally, there may not be sufficient room in the engine compartment adjacent the battery to allow a workman to easily apply the torque needed to install or to remove the block. Similar drawbacks are present with the second-discussed prior art embodiment. This complicates installation and removal of the block, and also adds to the cost thereof not only because of the extended labor time, but also because of the need for additional tools.

The battery hold down strap of the present invention is intended to alleviate drawbacks presented by the prior art straps.

OBJECTS AND SUMMARY OF THE INVENTION

A general object of the invention is to provide a new and improved device for holding down a battery.

Another object of the present invention is to provide a battery hold down strap comprising only one piece.

An additional object of the invention is to provide a battery hold down strap which facilitates faster and easier assembly and disassembly with a battery than other straps currently available.

Yet another object of the invention is to provide a battery hold down strap which is less expensive to produce than other, currently available straps.

An additional object of the present invention is to provide a battery hold down strap which does not require a tool for assembly or disassembly with a battery.

A further object of the invention is to provide a battery hold down strap which may be assembled with a battery by pushing the strap onto threaded studs, and which may be disassembled from the battery by squeezing and lifting portions of the strap by hand.

A strap, constructed according to the teachings of the present invention, for releasably holding a battery in a predetermined position on a platform having a projecting threaded stud flanking the battery, comprises a stud engaging portion connected integrally with a bar engagable with the battery for releasably holding the battery in the predetermined position. The stud engaging portion has a threaded section meshable with threads on the projecting stud. The stud engaging portion includes means for shifting the threaded section between a stud engaging position whereat the threaded section meshes with the threads on the stud for holding the battery in the predetermined position, and a stud releasing position whereat the threaded section is offset from the threads on the stud for allowing shifting of the strap along the stud.

BRIEF DESCRIPTION OF THE DRAWINGS

The organization and manner of the structure and operation of the invention, together with further objects and advantages thereof, may best be understood by reference to the following description taken in connection with the accompanying drawings, wherein like reference numerals identify like elements in which:

FIG. 1 is a side elevational view of the battery hold down strap, constructed according to the teachings of the present invention, releasably holding a battery on a platform;

FIG. 2 is an enlarged top plan view of the battery hold down strap of FIG. 1;

FIG. 3 is a sectional view, taken along line 3—3 of FIG. 2, illustrating jaws of the strap releasably engaging threads on a stud, shown in phantom;

FIG. 4 is a sectional view, similar to that of FIG. 3, showing the jaws in a flexed position, thereby releasing the threads;

FIG. 5 is an enlarged sectional view, taken along line 5—5 of FIG. 2, illustrating the construction of the jaws;

FIG. 6 is a partial top plan view of another embodiment of the jaws, showing the jaws releasably engaging threads on a stud; and FIG 7 is a view, similar to that of FIG. 5, illustrating the jaws in a flexed position, thereby releasing the threads.

DETAILED DESCRIPTION OF THE PREFERRED EMBODIMENT

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

Referring initially to FIG. 1, a battery hold down strap 10, constructed according to the teachings of the present invention, releasably variably connected to two threaded studs 12a and 12b, is illustrated. The studs 12a and 12b are fixed at one end to a platform 14, specifically constructed and configured to retain a battery 16 in a predetermined position, with a free end of each stud 12a and 12b extending beyond a top surface of the battery 16. The studs 12a and 12b extend upwardly substantially perpendicularly to the platform 14 flanking opposite sides of the battery 16. The strap 10 is releasably variably connected, by means to be discussed hereinbelow, to portions of the studs 12a and 12b with one side of the strap 10 clampingly confronting and engaging the battery 16 along its top surface to retain the battery 16 in the predetermined disposition on the platform 14.

The strap 10 is preferably molded in one piece from a suitably strong resilient plastics material such as nylon. This is an improvement over the straps of the prior art which require multiple pieces and tools in addition to the strap itself for installation and removal thereof. Furthermore, the particular construction of the strap 10 allows it to be installed and removed relatively easily and in less time as compared with straps of the prior art.

The unique construction of the strap 10 is illustrated in FIGS. 2 and 3. As shown, the strap 10 comprises a longitudinally elongate bar 18 having identically constructed stud-engaging portions 20a and 20b disposed on opposite latitudinal ends. The bar 18 is of dimensions sufficient for extending from one stud 12a across the battery 16 to the other stud 12b. The bar 18 has a substantially planar battery-engaging underside 22 which clampingly compresses the battery 16 between itself and the platform 14, as shown in FIG. 1, when the strap 10 is appropriately installed. This clamping compression is sufficient to maintain the battery 16 in the predetermined position when jostled. It is to be noted, however, that the underside 22 may be of different configurations to provide increased clamping compression of the battery 16. Also, in a preferred construction, the bar 18 may have one or more relieved sections 23, visible in FIGS. 2, 3, and 4, which reduce the weight of the strap 10 without sacrificing the structural integrity thereof.

The construction of the stud-engaging portions 20a and 20b is illustrated in FIGS. 3 and 4. The portions 20a and 20b each comprise a pair of opposing jaws 24a and 24b, a pair of levers 26a and 26b associated with the jaws 24a and 24b, respectively, and a ring 28. While these elements are described as being distinct, it is to be remembered that the entire strap 10 is molded as one piece. Of those elements, only the ring 28 is directly connected to the bar 18. Specifically, each ring 28 is fixedly attached at one side thereof to opposite latitudinal ends of the bar 18, as shown in FIG. 2.

As illustrated in FIG. 2, the rings 28 are preferably substantially rectangular in shape including opposite side portions 29 and 31, and having an interior periphery 32 and an exterior periphery 34. In a preferred construction, a center section 30 of the bar 18, flanked longitudinally by the relieved sections 23, extends from the exterior periphery 34 to the interior periphery 32 where the section 30 terminates. The center section 30 thereby provides a strong and firm connection between the bar 18 and the ring 28, thereby insuring the structural integrity of the strap 10.

With reference to FIG. 5, the structural relationships among the jaws 24a and 24b, the levers 26a and 26b, and the ring 28 will be discussed. The jaws 24a and 24b are molded integral with and depending from opposite side portions 29 and 31 of the ring 28 at an angle sloping slightly inwardly from the periphery 32. The jaws 24a and 24b depend from the ring 28 in a diametrically sloping opposed fashion so that terminal ends of the jaws 24a and 24b approach each other. This facilitates engagement of the studs 12a and 12b by the jaws 24a and 24b. The jaws 24a and 24b depend from the ring 28 a certain distance specifically determined to maximize clamping compression of the battery 16 between the underside 22 of the bar 18 and the platform 14, thereby retaining the battery 16 in a predetermined disposition on the platform 14.

To insure that the jaws 24a and 24b sufficiently engage the studs 12a and 12b to firmly hold the battery 16, thread sections or stud clamping sections 36a and 36b are disposed on the jaws 24a and 24b, respectively, in diametrically opposing fashion. The thread sections 36a and 36b are constructed for engaging and firmly mating with threads 38a and 38b on the studs 12a and 12b, respectively.

The thread section 36b is offset vertically on the jaw 24b with respect to the disposition of the thread section 36a on the jaw 24a. This relative offset relationship serves to strengthen the engagement between the sections 36a and 36b and the threads 38a and 38b. Thus, jostling of the battery 16 will not cause disengagement thereby preserving the battery 16 in the desired position.

It is not necessary that the sections 36a and 36b engage the threads 38a and 38b along the entire circumference thereof. Accordingly, as illustrated in FIG. 2, the sections 36a and 36b each angularly extend only through a substantially ninety degree arc. Therefore, the jaws 24a and 24b also need only angularly extend through that same arc proximate to the sections 36a and 36b. But, as shown in FIG. 2, the jaws 24a and 24b, as well as the levers 26a and 26b, flare out upwardly from the sections 36a and 36b to provide a contact area of sufficient dimensions to facilitate manipulation of the jaws 24a and 24b, as will be discussed further hereinafter. The jaws 24a and 24b flare out from the sections 36a and 36b to a juncture between the jaws 24a and 24b and the ring side portions 29 and 31.

The levers 26a and 26b are molded such that they project angularly upwardly away from the ring side portions 29 and 31 oppositely from the jaws 24a and 24b. The levers 26a and 26b angularly project from the ring 28 such that they move away from each other as the levers 26a and 26b progress away from the ring 28. The levers 26a and 26b also flare out upwardly from the ring 28 through the same substantially ninety degree arc defined by the flaring of the jaws 24a and 24b. In this manner, as is visible in FIG. 2, the jaws 24a and 24b and the levers 26a and 26b, respectively, all flare upwardly substantially similarly so as to form a substantially continuously smooth curve.

However, as is illustrated in FIGS. 2 through 5, the interior periphery 32 of the ring 28 protrudes into the curve formed by the flaring configuration defined by the jaws 24a and 24b and the levers 26a and 26b. These protrusions 40a and 40b of the interior periphery 32 define a demarcation between the angle through which the jaws 24a and 24b depend from the ring 28, and the angle through which the levers 26a and 26b project from the ring 28, as shown in FIG. 5. This angular difference facilitates shifting of the jaws 24a and 24b about the ring side portions 29 and 31 between a stud engaging position, illustrated in FIG. 3, and a stud releasing position, illustrated in FIG. 4. The side portions 29 and 31 provide, in effect, a torsion spring action aggressively biasing the jaws into engagement with the stud.

To facilitate manipulation of the jaws 24a and 24b, and to insure that the jaws 24a and 24b firmly engage the studs 12a and 12b, reinforcing members 40a and 40b extend from a side of the levers 26a and 26b opposite to a side thereof contacting the interior periphery 32, across the exterior periphery 34 of the ring 28, and to a side of the jaws 24a and 24b opposite to side thereof bearing the sections 36a and 36b. The reinforcing members 42a and 42b engage the jaws 24a and 24b adjacent the sections 36a and 36b for providing added strength to the engagement between the sections 36a and 36b and the threads 38a and 38b on the studs 12a and 12b, respectively. The members 42a and 42b stiffen the jaws 24a and 24b and the levers 26a and 26b so that the primary flexing takes place in the resilient torsion spring side portions 29 and 31 when the levers 26a and 26b are squeezed together to open the jaws 24a and 24b.

With the construction of the strap 10 thusly disclosed, the operation thereof will now be discussed. It is to be noted that a greater understanding of the construction of the strap 10 should be gained by reference to the following discussion.

To employ the strap 10 to retain a battery 16 in a predetermined position on a platform 14, the battery 16 must first be placed in that predetermined position. When this is done, as illustrated in FIG. 1, the studs 12a and 12b flank the battery 16 along opposite sides thereof. The strap 10 can now be placed over the studs 12a and 12b, and moved downwardly therealong to clampingly compress the battery 16 between the strap 10 and the platform 14, thereby releasably retaining the battery 16 in the predetermined position.

First, the strap 10 must be aligned with the studs 12a and 12b so that the free ends of the studs 12a and 12b are in axial alignment with the jaws 24a and 24b, or, more specifically, with spaces defined by the jaws 24a and 24b. The threaded sections 36a and 36b are constructed for confronting and engaging the threads 38a and 38b on the studs 12a and 12b, that is, the threaded sections 36a and 36b are configured to mesh with the threads 38a and 38b.

In order to achieve this meshed interengagement of the sections 36a and 36b with the threads 38a and 38b, a compressive force should be applied to the levers 26a and 26b, as illustrated by the oppositely directed arrows 44 in FIG. 4. The levers 26a and 26b act as mechanical levers for flexing the jaws 24a and 24b about the axes of the resilient side portions 29 and 31 and into the stud releasing position of FIG. 4.

Preferably, the compressive force or squeezing action is applied to the levers 26a and 26b proximate to the terminal ends of each. This should be done with both stud-engaging portions 20a and 20b simultaneously. In this manner, a person applying the compressive force can use the mechanical advantage provided by the length of the levers 26a and 26b, thereby reducing the magnitude of the force necessary to flex the jaws 24a and 24b into the stud releasing position. As the force is applied to the levers 26a and 26b, the levers 26a and 26b move inwardly towards each other.

As the levers 26a and 26b move towards each other, the force is transmitted to the ring 28, causing the ring portions 29 and 31 to flex torsionally. Torsional flexing of the ring portions 29 and 31 causes the jaws 24a and 24b to flex outwardly away from each other, thereby expanding or opening the spaces therebetween. The magnitude of the force applied must be sufficient to flex the jaws 24a and 24b away from each other to create an opening of dimensions sufficient for the jaws 24a and 24b to freely accept the studs 12a and 12b. The jaws 24a and 24b are now in the stud releasing position.

Because the studs 12a and 12b are properly aligned with the stud-engaging portions 20a and 20b, the strap 10 may now be positioned on the studs 12a and 12b. The strap 10 is moved downwardly with the studs 12a and 12b passing between the two sets of jaws 24a and 24b until the underside 22 contacts the top surface of the battery 16. The strap 10 is forced down on top of the battery 16 to hold the battery 16 in the predetermined position.

At this point, the application of the compressive force can cease. The torsion spring side portions 29 and 31 are now free to flex torsionally, returning towards their original condition. The natural resiliency of the plastic material comprising the strap 10 causes the jaws 24a and 24b to spring back into the stud engaging position under the influence of torsional flexing of the ring portions 29 and 31. The sections 36a and 36b should mesh with the threads 38a and 38b. If the sections 36a and 36b do not mesh with the threads 38a and 38b immediately upon return of the jaws 24a and 24b to the stud engaging position, the strap 10 can be pushed downwardly slightly to align the sections 36a and 36b with the threads 38a and 38b.

The strap 10 will now hold the battery 16 in the predetermined position until the jaws 24a and 24b are moved into the stud releasing position by reversing the above-described process. It is also to be noted that the resiliency of the plastic material comprising the strap 10 allows for a somewhat simpler installation procedure as compared with the straps of the prior art.

Alternatively, once the stud-engaging portions 20a and 20b are aligned with the studs 12a and 12b, the strap 10 may be pushed downwardly onto the studs 12a and 12b without application of a compressive force to the levers 26a and 26b. The forced contact between the sections 36a and 36b and the threads 38a and 38b causes the jaws 24a and 24b to move towards the stud releasing position. Once the application of the downward force has ceased, the jaws 24a and 24b will move back to the stud engaging position. The sections 36a and 36b can be aligned with the threads 38a and 38b as before. However, to remove the strap 10, the compressive force must be applied as detailed above.

FIG. 6 and FIG. 7 illustrate another embodiment of the invention. The key difference between this embodiment and the embodiment of FIGS. 1 through 4 is the construction of the stud-engaging portions. It is to be noted that the functionality of each embodiment is substantially similar. This embodiment is also molded as one piece from a suitable plastics material such as nylon.

FIG. 6 shows a strap 46 having uniquely constructed stud-engaging portions 48, only one of which being shown, disposed on opposite ends of a bar 50. The stud-engaging portions 48 function substantially similarly to the stud-engaging portions 20a and 20b, as described above. The stud-engaging portions 48 are preferably identically constructed, comprising a substantially circular ring 52 bearing a pair of diametrically opposed threaded sections 54a and 54b extending inwardly from an interior periphery 56 of the ring 52 at opposite side portions 55 and 57 in substantial alignment with the bar 50.

The threaded sections 54a and 54b are constructed and configured to mesh with the threads 38a and 38b disposed on the studs 12a and 12b in a manner substantially similar to the meshing of the thread sections 36a and 36b with the threads 38a and 38b, as discussed in detail above. The strap 46 releasably retains the battery in a predetermined position by means of cooperative meshing of the threaded sections 54a and 54b with the threads 38a and 38b on the studs 12a and 12b, as discussed above with respect to the first-mentioned embodiment of the invention.

To apply the strap 46 to the studs 12a and 12b, only one of which being shown in FIGS. 6 and 7, a compressive or squeezing force must be applied to the ring 52 of each stud-engaging portion 48 simultaneously. The force, designated by the arrows 58 in FIG. 7, is applied to the ring 52 at diametrically opposed locations on side portions 59 and 61 of the ring 52 offset substantially ninety degrees along the circumference of the ring 52 from the threaded sections 54a and 54b.

Application of the compressive force causes the ring 52 to flex, as illustrated in FIG. 6, thereby deforming the substantially circular at rest configuration of the ring 52 into a substantially oval configuration. The major axis of this substantially oval configuration is of a length sufficient to shift the threaded sections 54a and 54b into a thread releasing position, thereby allowing the studs 12a and 12b to be inserted into the stud-engaging portions 48a and 48b. Accordingly, the strap 46 can be applied to the studs 12a and 12b in substantially the same manner as the strap 10.

Once the bar 50 of the strap 46 engages the battery appropriately along a top surface thereof, the threaded sections 54a and 54b can be shifted into the stud engaging portion illustrated in FIG. 5. To do this, the compressive force is removed from the exterior periphery of the ring 52. The elastic and resilient properties of the plastic material comprising the strap 46 cause the ring 52 to function as a spring and to return towards its at rest, substantially circular configuration. As the ring 52 does this, the threaded sections 54a and 54b engage and mesh with the threads 38a and 38b on the studs 12a and 12b. If this meshing does not occur immediately, then a force can be applied to the strap 46 to facilitate meshing as discussed above with respect to the strap 10.

While preferred embodiments of the present invention have been shown and described, it is envisioned that those skilled in the art may devise various modifications of the present invention without departing from the spirit and scope of the appended claims. The invention is not intended to be limited by the foregoing disclosure, but only by the following appended claims.

The invention claimed is:

1. A one piece strap of resilient plastic material for releasably holding a battery in a predetermined position on a platform having projecting studs, the strap comprising: a bar for traversing the battery between the studs; a stud engaging portion connected integrally with said bar; the stud engaging portion including a continuous flexible ring having flexible walls and a stud engaging section formed on an inside surface of the flexible walls engagable with an outside surface of a projecting stud; and the stud engaging portion including means for flexing the flexible walls of said continuous flexible ring relative to said outside surface of said stud for shifting said stud engaging section between a stud engaging position and a stud releasing position and clampingly engaging said stud in the stud engaging position.

2. A strap as defined in claim 1 wherein the strap is molded in one piece form a resilient plastic material.

3. A strap as defined in claim 1 wherein the bar is sufficiently elongated for traversing the battery from one side thereof to another; the bar having ends; and a stud engaging portions being disposed on at least one of the ends of the bar.

4. A strap as defined in claim 3 which includes a stud engaging portion disposed on each end of the bar; said stud engaging portions being substantially identically constructed.

5. A strap as defined in claim 1 wherein the bar includes a relieved section for reducing the weight of the bar without compromising the structural integrity thereof.

6. A strap as defined in claim 1 wherein the section defines a substantially ninety degree arc.

7. A strap as defined in claim 1 wherein the stud engaging portion includes a ring, a pair of jaws depending from the ring, and each jaw bearing a section engagable with a projecting stud; and the means for shifting said section comprising a pair of levers extending from the ring operatively associated with the jaws so that moving of the levers causes corresponding movement of the jaws, thereby shifting the section on each jaw between the stud engaging position and the stud releasing position.

8. A strap as defined in claim 7 wherein the jaws are disposed in substantially diametric opposition on the ring; the jaws approaching each other as the jaws depend from the ring; the levers extending upwardly from the ring at a position above the jaws; the levers receding from each other as the levers extend from the ring; and movement of the levers causing resilient torsional twisting of portions of the rig from which the jaws depend, and the torsional twisting of the portions of the ring causing the jaws to shift between the stud engaging position and the stud releasing position.

9. A strap as defined in claim 7 further comprising a reinforcing member connecting the levers to the jaws for facilitating conjoint flexing thereof.

10. A strap as defined in claim 1 wherein the stud engaging portion comprises a ring having an exterior periphery and an interior periphery; the section extending inwardly from the interior periphery of the ring; and said ring flexing upon application of a force to opposite portions thereof for shifting the section between the stud engaging position and the stud releasing position.

11. A strap as defined in claim 10 wherein the ring has a substantially circular configuration in the stud engaging position, and a substantially oval configuration in the stud releasing position; and two of said sections disposed in substantially diametric opposition on the interior periphery.

12. A strap as defined in claim 1 wherein the ring is resiliently twistable for flexing said ring between a stud engaging position and a stud releasing position.

13. A strap as defined in claim 1 wherein the ring is radially compressible for flexing said ring between a stud engaging position and a stud releasing position.

14. A one piece resilient plastic strap for retaining a battery adjacent a member comprising: a bar for traversing a space between the battery and the member; a member engaging portion integral with the bar; said member engaging portion including a ring providing a resilient spring portion, said ring being coaxially engagable with said member adjacent said battery; opposing member engaging sections located on an inside surface of said ring, and extending inwardly of said ring proximate said spring portion, said spring portion imposing member engaging biasing forces on said opposed member engaging sections; and said spring portion being selectively resiliently yieldable for shifting said member engaging sections between a member engaging position and a member releasing position.

15. A strap as defined in claim 14 wherein said ring includes opposite generally straight sides providing said spring portion; said sides being resiliently twistable for shifting the member engaging sections between said member engaging position and said member releasing position.

16. A strap as defined in claim 15 wherein said member engaging sections comprise jaws respectively depending form said sides.

17. A strap as defined in claim 16 wherein said member engaging portion includes levers respectively extending form said sides oppositely from said jaws for facilitating twisting of said sides to shift the jaws from the member engaging position towards the member releasing position.

18. A strap as defined in claim 14 wherein said spring portion is resiliently radially collapsible in one direction for spreading said member engaging sections towards said member releasing position.

19. A strap as defined in claim 18 wherein said member engaging sections are respectively integral with opposite side portions of said ring which are substantially in alignment with said bar; and said spring portion being located between said opposite side portions and transversely of said bar.

20. A strap as defined in claim 14 wherein the ring is resiliently twistable for flexing said ring between a stud engaging position and a stud releasing position.

21. A strap defined in claim 14 wherein the ring is radially compressible for flexing said ring between a stud engaging position and a stud releasing position.

22. A one piece strap of resilient plastic material for releasably holding a battery in a predetermined position on a platform having projecting studs, the strap comprising: a bar for traversing the battery between the studs; a stud engaging portion connected integrally with said bar; the stud engaging portion including a ring, a pair of jaws depending from the ring, and each jaw bearing a section engagable with a projecting stud; the stud engaging portion including means for shifting said section between a stud engaging position and a stud releasing position; and said means for shifting said section comprising a pair of levers extending from the ring operatively associated with the jaws so that movement of the levers causes corresponding movement of the jaws, thereby shifting the section on each jaw between a stud engaging position and a stud releasing position.

23. A strap as defined in claim 22 wherein the jaw are disposed in substantially diametric opposition on the ring; the jaws approaching each other as the jaws depend from the ring; the levers extending upwardly from the ring at a position above the jaws; the levers receding from each other as the levers extend from the ring; and movement of the levers causing resilient torsional twisting of portions of the ring from which the jaws depend, and the torsional twisting of the portions of the ring causing the jaws to shift between the stud engaging position and the stud releasing position.

24. A strap as defined in claim 22 further comprising a reinforcing member connecting the levers to the jaws for facilitating conjoint flexing thereof.

25. A one piece resilient plastic strap for retaining a battery adjacent a member, said plastic strap comprising: a bar for traversing a space between the article and the member; a member engaging portion integral with the bar; said member engaging portion including a ring having opposite generally straight sides providing a resilient spring portion; opposing jaws respectively depending from said sides of said ring, and said sides defining said spring portion being resiliently twistable for shifting the jaws between a member releasing position.

26. A strap as defined in claim 25 wherein said member engaging portion includes levers respectively extending form said sides oppositely from said jaws for facilitating twisting of said sides to shift the jaws form the member engaging position towards the member releasing position.

* * * * *

UNITED STATES PATENT AND TRADEMARK OFFICE
CERTIFICATE OF CORRECTION

PATENT NO. : 5,228,532
DATED : July 20, 1993
INVENTOR(S) : Teresa M. Browning and Joseph W. Staniszewski It is certified that error appears in the above-identified patent and that said Letters Patent is hereby corrected as shown below:

Column 8, Line 22 "form" should be -- from --
Column 9, Line 37 "form" should be -- from --
Column 9, Line 40 "form" should be -- from --
Column 10, Line 23 "jaw" should be --jaws --
Column 10, Line 50 "form" should be --from --
Column 10, Line 51 "form" should be -- from --

Signed and Sealed this

Sixteenth Day of May, 1995

Attest:

BRUCE LEHMAN

Attesting Officer        Commissioner of Patents and Trademarks